A. B. MITCHELL.
ACETYLENE LAMP.
APPLICATION FILED AUG. 12, 1913.
1,141,475.
Patented June 1, 1915.
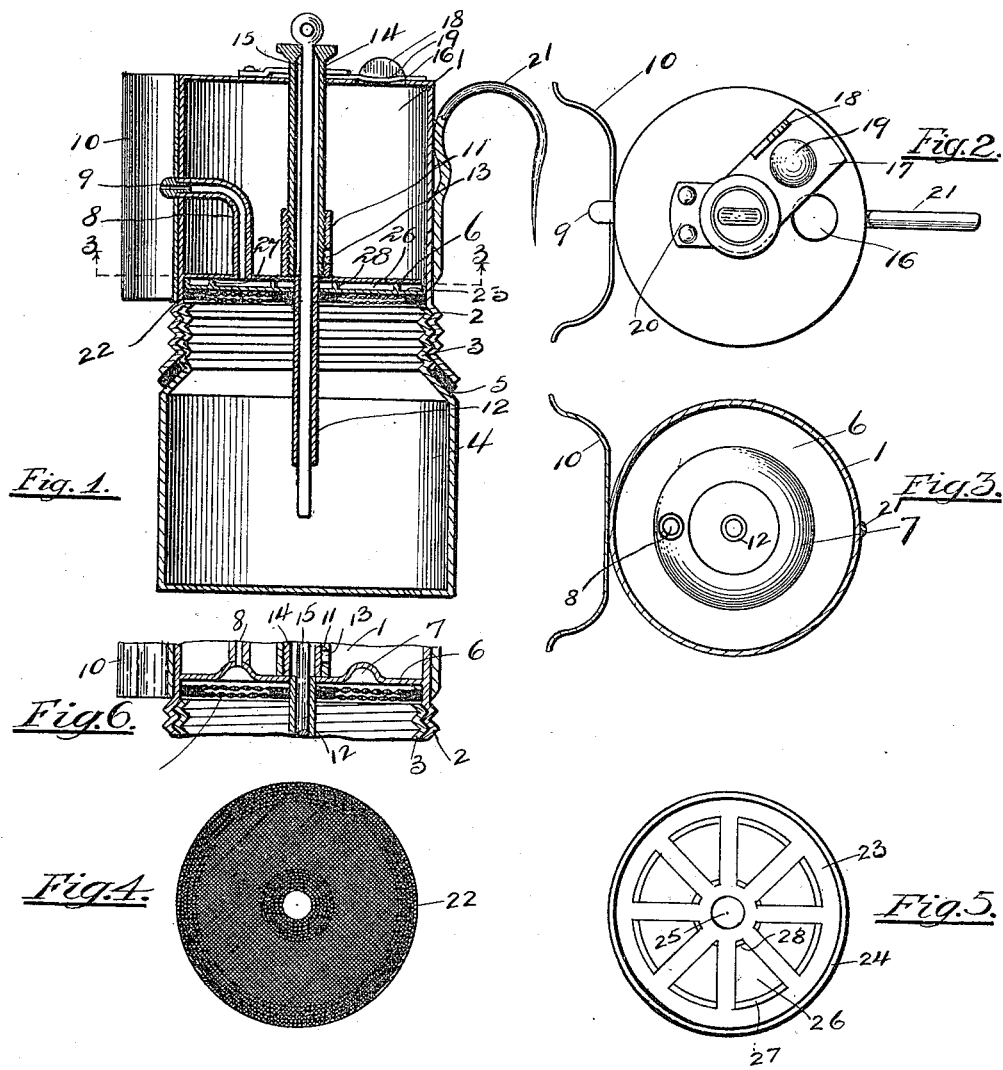
Witnesses
W. C. Crickett
Nomie Welch
Inventor
Arthur B. Mitchell.
By
Attorney

UNITED STATES PATENT OFFICE.

ARTHUR B. MITCHELL, OF BIRMINGHAM, ALABAMA.

ACETYLENE-LAMP.

1,141,475. Specification of Letters Patent. Patented June 1, 1915.

Application filed August 12, 1913. Serial No. 784,408.

*To all whom it may concern:*

Be it known that I, ARTHUR B. MITCHELL, a citizen of the United States of America, residing at Birmingham, in the county of Jefferson and State of Alabama, have invented certain new and useful Improvements in Acetylene-Lamps, of which the following is a specification.

My invention relates to certain new and useful improvements in acetylene lamps, my object being to simplify and perfect the means for filtering the gas as it flows to the burner and to also improve the general construction of the lamp and the manner of controlling the water feed into the carbid container.

In present practice gas generated by the admission of water into the carbid container is filtered by being passed up either through a single thickness of wire gauze to the burner or through such wire gauze and a felt or porous filter disposed between the gauze screen and the gas outlet. In lamps using a wire gauze screen of a single thickness it has been found that the gas is so imperfectly filtered that the burner becomes quickly clogged. The extreme delicacy of an abnormally fine mesh wire screen, its expensiveness, and the fact that it is subjected at times to very considerable gas pressure, makes it impractical to use screens finer than sixty mesh and such a screen will not by itself properly filter the gas and free it of dust and ash. Where filtering material, such as felt, cotton fiber, or the like is interposed above the wire screen, it has been found that such material tends to quickly become choked with the dust so that it will not deliver a uniform and regular supply of gas to the burner. Also such porous filters require constant attention.

According to my invention, I have found that by using two sheets of fine mesh wire gauze to form the filtering screen I obtain the most satisfactory results because such a screen possesses the requisite strength for the duty required of it; it effectively screens the gas and protects the burner; it is practically indestructible; and it requires no attention and does not become clogged. Such a wire gauze screen possesses an additional advantage over the combination of wire and felt or cotton screen in that the felt or cotton (when left loose so it can be readily removed) is forced by the gas pressure against the gas outlet thereby tending to clog it, whereas the wire gauze screen holds its position and cannot clog the gas outlet. By fastening the layers of the screen together so that the strands of one will diagonally cross interstices of the other, a double screen is provided having, when layers of sixty mesh screen are used, a mesh equivalent to one hundred and twenty mesh and having many times the strength of a single thickness of a one hundred and twenty mesh gauze.

A further object of my invention is to provide a simple and effective means for facilitating the collection and delivery of the screened gas to the burner.

A further important object of my invention is to provide both screen and spider attachments which can be inserted in lieu of the felt and cotton filters in the present types of lamps, thereby enabling such lamps to be equipped without change with my improved wire screen and provided with ample space for the collection and delivery of the filtered gas to the burner passage.

My invention further comprises the features of construction and arrangement of parts which are hereinafter more particularly described and claimed, reference being had to the accompanying drawings which illustrate the preferred embodiment of my invention, and in which:—

Figure 1 is a vertical sectional view through my improved lamp. Fig. 2 is a top plan view of Fig. 1. Fig. 3 is a bottom view of the water tank taken on the line 3—3 of Fig. 1. Fig. 4 is a plan view of my double wire gauze screen. Fig. 5 is a top plan view of a spider which may be interposed between the screen and the tank bottom or diaphragm containing the gas outlet port. Fig. 6 is a modified view showing the tank bottom provided with a gas collecting groove which serves the purposes of the spider used in Fig. 1.

Similar reference numerals refer to similar parts throughout the drawings.

My invention, as illustrated in the drawings, comprises a water tank 1 provided with a bottom threaded flange 2 adapted for threaded engagement with a similarly threaded flange 3 at the top of the carbid container 4, a suitable packing ring 5 being interposed between the threaded flanges to effectively seal the joint. The water tank has a bottom or diaphragm 6 which may be flat as shown in Fig. 1, or as seen in Fig. 6 it may be provided with a circular intermediate gas collecting groove 7 from which a gas pipe 8 leads to the burner 9. A suitable reflector 10 is attached to one side of the water tank and has a central opening through which the burner projects. Mounted at the center of the diaphragm 6 is an internally threaded sleeve 11 which extends upwardly into the water tank. A tubular extension 12 depends from the diaphragm 6 into the carbid receptacle and is disposed concentric with the sleeve 11 which has a water port 13 near its bottom. A threaded sleeve 14 having a milled top is inserted through an opening in the top of the water tank and has its lower end externally threaded and screwed into the sleeve 11. A rod 15 is passed down through sleeve 14, diaphragm 6 and through tube 12, in the latter of which it makes a close but not water tight fit. By screwing the sleeve 14 so as to open the port 13 more or less I control the quantity of water fed through tube 12 into the carbid tank. The water tank has a water inlet port 16 normally closed by a pivoted horizontally swinging plate 17 having at one side a thumb hold 18 and in its center a circular depression 19 adapted to snap into and close the opening. The plate 17 pivots about the sleeve 14 and is held pressed against the tank top by an angle plate 20 which is riveted to the top and has a circular opening through which the top of sleeve 14 passes. A suitable hook or hanger 21 is attached to the rear side of the water tank.

The wire gauze screen for filtering the gas generated in the container 4, comprises two superimposed sheets of fine mesh wire gauze 22, which sheets are preferably soldered or otherwise fastened together around their peripheries and also around a central opening through which the tube 12 passes. The two thicknesses of the wire gauze are thus formed into a unitary screen, providing relative arrangement of the strands of the two thicknesses jointly an exceedingly fine mesh filter for the gas which effectively cleans it, and yet they reinforce each other so as to give the screen the requisite strength to withstand the gas pressures and to possess enduring lasting qualities. Preferably the strands of one thickness are laid to diagonal the interstices of the other thickness. Only two thicknesses can be successfully joined together because it is desirable to have access to each layer to remove the incrustation. The screen should be mounted in the lamp so that it can be easily removed and to that end I prefer to clamp it in position between the top of the sleeve 3 of the carbid container and the grooved bottom 6 of the water tank as seen in Fig. 6, or when the tank bottom has no gas collector groove I interpose between the screen and the flat bottom 6 of the water tank a spider 23, see Fig. 1, having a continuous upturned circular flange 24 about its outer margin and a circular center opening 25 for the tube 12. The spider has a series of openings 26 which are segment shaped and bordered at their outer edges with upturned curved flanges 27 and at their inner edges with similar shorter flanges 28. These several flanges 24, 27 and 28 serve to engage the bottom of the water tank and space the screen therefrom while the openings 26 permit the filtered gas to flow freely therethrough to the outlet pipe 8. Where lamps have flat tank bottoms or diaphragms with the inlet end of the pipe 8 flush therewith, such spiders will provide a chamber in which the screened gas collects and freely flows from all sides into the outlet. Where the gas collecting groove 7 is employed, the spider is not required, though it may be used, if desired, to furnish a freer circulation of the gas and to prevent a loose screen being forced against the tank bottom, thereby reducing the available area of filtering surface of a detachable screen.

My removable wire gauze screen and its reinforcing spider can be readily inserted in lamps now in use, their combined thickness being generally less than the thickness of the body of filtering material used in such old style lamps.

Having thus described my invention, what I claim as new and desire to secure by Letters Patent, is:—

1. In combination, a carbid lamp, a water tank, a carbid container having a gas filtering screen across its upper portion, said tank having an upstruck channel formed around its bottom intermediate the center thereof and its periphery and its inner and outer annular walls adapted to engage the center and marginal wall of said screen, an outlet port formed in said channel, and a gas pipe leading from said outlet port, said screen being removably mounted between the container and tank, substantaially as described.

2. In combination, a carbid lamp, a water tank, a carbid container having a gas filtering screen across its upper portion, said tank having an upstruck channel formed around its bottom intermediate the center thereof and its periphery, an outlet port formed in said channel, a gas pipe leading from said outlet port and a spider detachably mounted between the water tank and the said filtering screen and having transverse arms lying across said screen, said screen being removably mounted on the container.

In testimony whereof I affix my signature in presence of two witnesses.

ARTHUR B. MITCHELL.

Witnesses:
NOMIE WELSH,
WM. C. PRICKETT.

Copies of this patent may be obtained for five cents each, by addressing the "Commissioner of Patents, Washington, D. C."